United States Patent
Kato et al.

(10) Patent No.: US 8,432,571 B2
(45) Date of Patent: Apr. 30, 2013

(54) IMAGE FORMING APPARATUS, POSTPROCESSING APPARATUS, OPTION APPARATUS, IMAGE FORMING SYSTEM, AND CONTROLLER

(75) Inventors: Hitoshi Kato, Toride (JP); Yasuo Fukatsu, Abiko (JP); Naoki Ishikawa, Kashiwa (JP); Tomoharu Sato, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/196,367

(22) Filed: Aug. 2, 2011

(65) Prior Publication Data

US 2012/0044530 A1 Feb. 23, 2012

(30) Foreign Application Priority Data

Aug. 23, 2010 (JP) ................................. 2010-186190

(51) Int. Cl.
*G06F 3/12* (2006.01)

(52) U.S. Cl.
USPC ............................................ 358/1.15; 399/9

(58) Field of Classification Search .................. None
See application file for complete search history.

(56) References Cited

U.S. PATENT DOCUMENTS

| | | | | |
|---|---|---|---|---|
| 2004/0184823 A1* | 9/2004 | Fujii et al. | ........................... | 399/9 |
| 2004/0223178 A1* | 11/2004 | Brown et al. | ................ | 358/1.15 |
| 2005/0082735 A1* | 4/2005 | Nakamura et al. | ................. | 271/1 |
| 2007/0047998 A1* | 3/2007 | Watanabe et al. | ............... | 399/88 |
| 2007/0076242 A1* | 4/2007 | Kanai | ........................... | 358/1.14 |
| 2007/0103714 A1* | 5/2007 | Ushiku | ........................ | 358/1.14 |
| 2007/0171454 A1* | 7/2007 | Takahashi et al. | ........... | 358/1.14 |
| 2012/0044530 A1* | 2/2012 | Kato et al. | .................... | 358/1.15 |

FOREIGN PATENT DOCUMENTS

JP 2007-065209 A 3/2007

* cited by examiner

*Primary Examiner* — Tammy Pham
*Assistant Examiner* — Frantz Bataille
(74) *Attorney, Agent, or Firm* — Canon USA, Inc., I.P. Division

(57) ABSTRACT

An image forming system including an image forming apparatus, which is configured to form an image on a sheet according to an input print job, and a plurality of postprocessing apparatuses, which is configured to execute postprocessing on a sheet discharged from the image forming apparatus, includes a supply unit configured to supply the plurality of postprocessing apparatuses with a signal, which instructs a batch power supply to the plurality of postprocessing apparatuses, and a control unit configured, after the plurality of postprocessing apparatuses have been powered on by the supply unit instructing the batch power supply, to discontinue a power supply to a second postprocessing apparatus, which is connected further downstream of a first postprocessing apparatus provided most downstream in a direction of conveying the sheet in the input print job, of the plurality of postprocessing apparatuses.

34 Claims, 11 Drawing Sheets

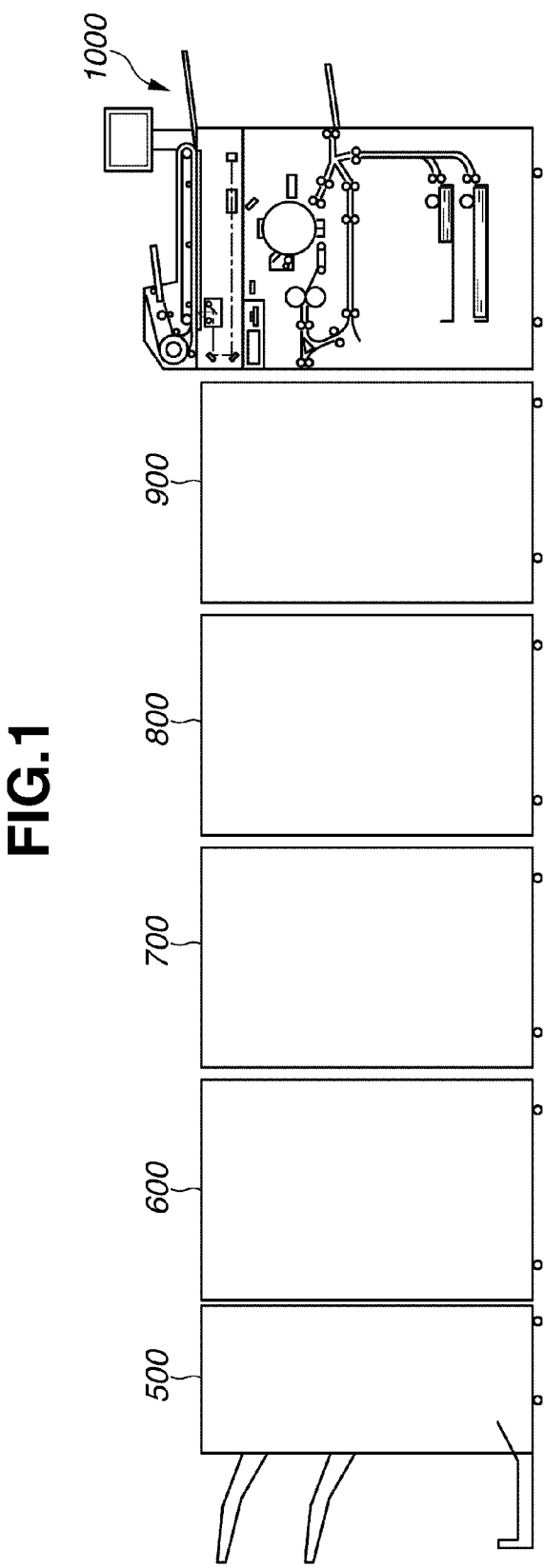

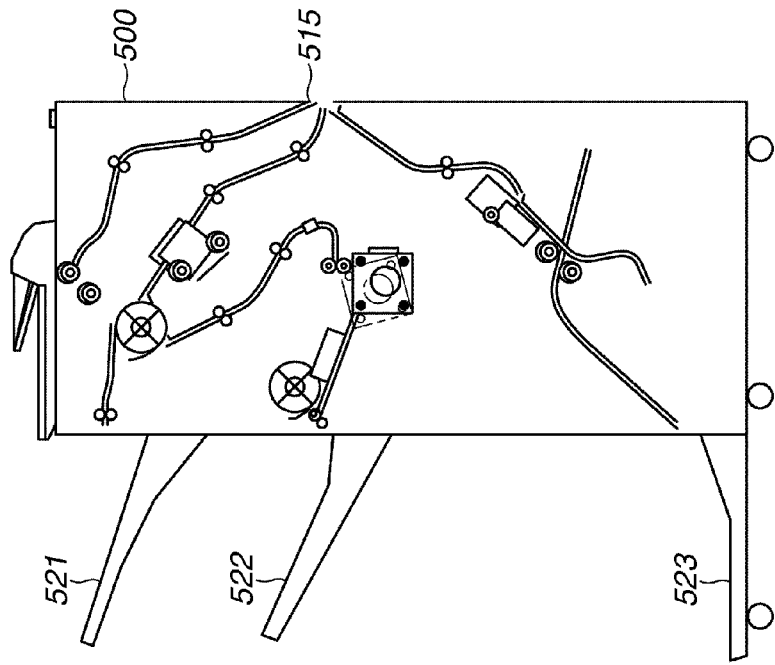
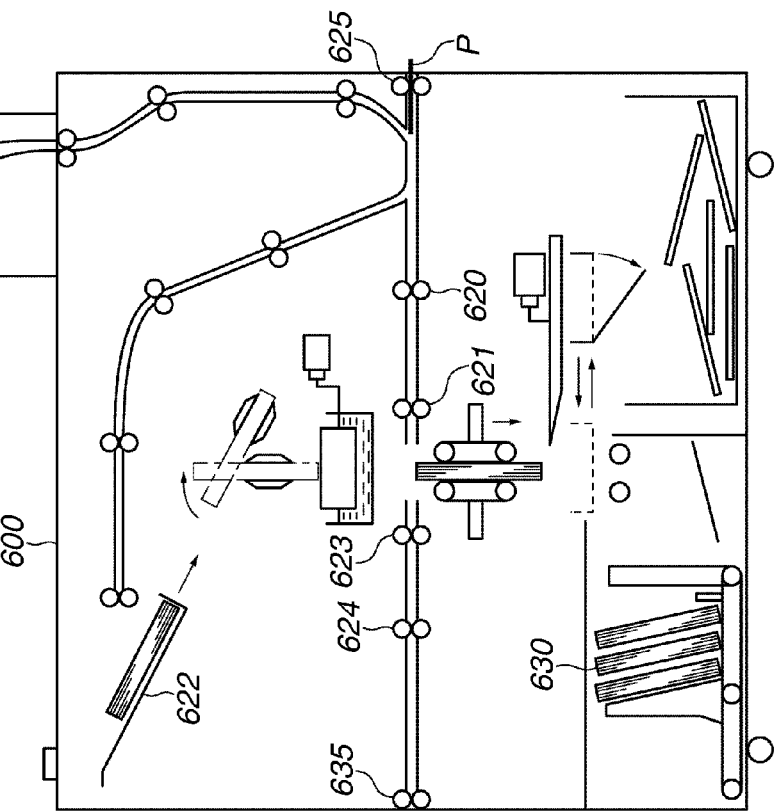

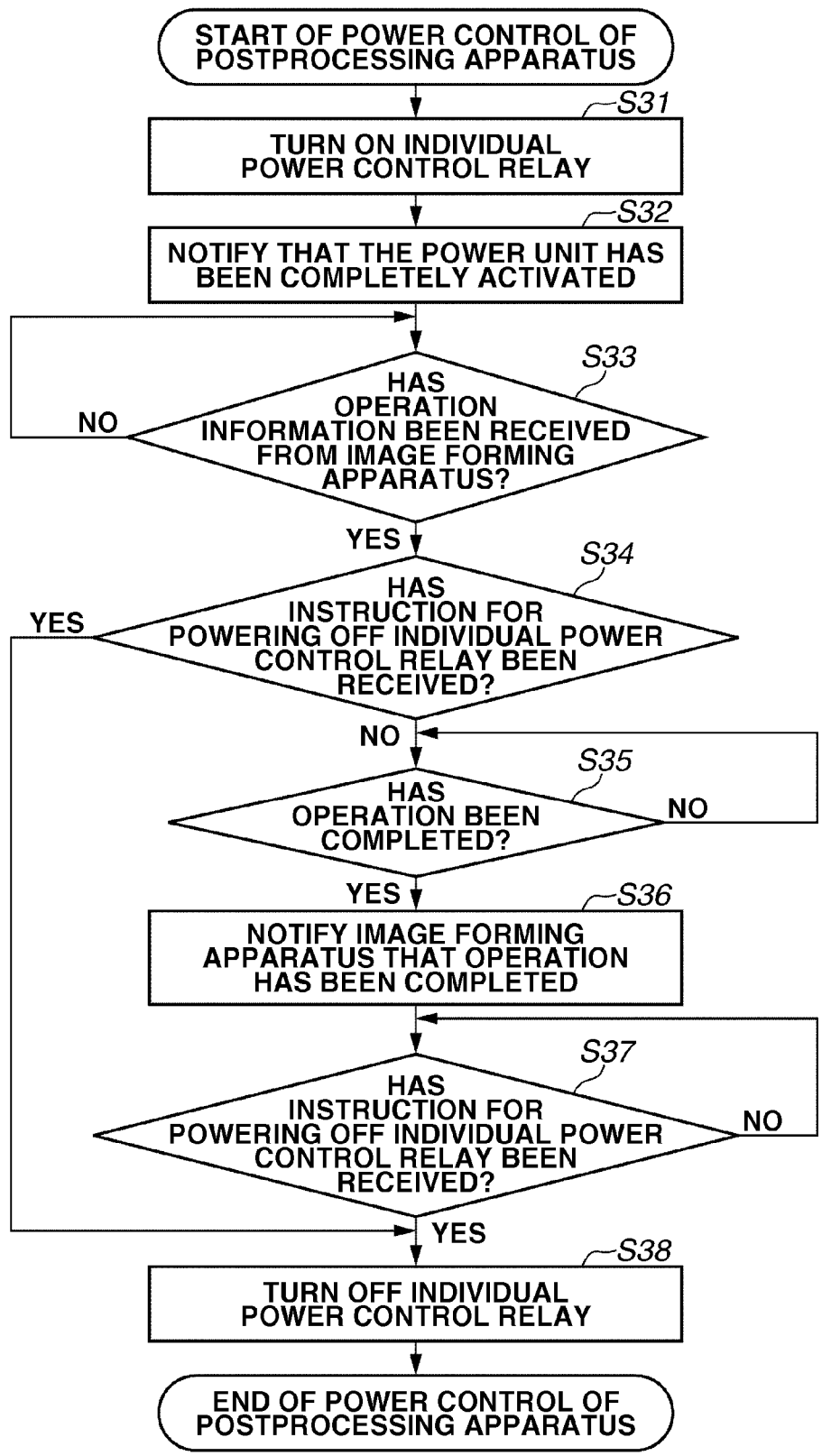

IMAGE FORMING APPARATUS, POSTPROCESSING APPARATUS, OPTION APPARATUS, IMAGE FORMING SYSTEM, AND CONTROLLER

BACKGROUND OF THE INVENTION

1. Field of the Invention

The present invention relates to an image forming apparatus, an option apparatus, which is configured to feed a sheet to the image forming apparatus, and a postprocessing apparatus, which is configured to execute postprocessing on a sheet discharged from the image forming apparatus, and also relates to an image forming system, which includes the image forming apparatus and at least one of the option apparatus and the postprocessing apparatus.

2. Description of the Related Art

An image forming system generally includes an image forming apparatus and a plurality of postprocessing apparatuses, which is connected to the image forming apparatus, such as a finisher, a stacker, or a gluing binding machine.

More specifically, the finisher can staple a bundle of sheets, which includes a number of sheets designated by a user and which has been conveyed from the image forming apparatus. In addition, the stacker can stack a large quantity of sheets conveyed from the image forming apparatus. Furthermore, the gluing binding machine glues the sheets conveyed from the image forming apparatus with a cover. In this manner, a book of a plurality of sheets can be generated.

In a conventional image forming system discussed in Japanese Patent Application Laid-Open No. 2007-065209, a switch, which is configured to partially turn on or off a power supply to the postprocessing apparatus by manually controlling the state of power supply, is provided in a specific postprocessing apparatus.

With the above-described configuration, the conventional image forming system can reduce the total power consumed by the entire image forming system because the power supply to a postprocessing apparatus that is not used can be discontinued. However, in the image forming system discussed in Japanese Patent Application Laid-Open No. 2007-065209, a user of the system is required to operate a switch for controlling the power supply to each postprocessing apparatus. Therefore, the above-described conventional system cannot achieve a high user operability.

SUMMARY OF THE INVENTION

One aspect of the present invention is directed to an image forming apparatus capable of easily stopping the power supply to a specific postprocessing apparatus and a postprocessing apparatus connected to the image forming apparatus, and the present invention is also directed to an image forming system including the printing apparatus and the image forming apparatus.

According to another aspect of the present invention, an image forming apparatus configured to form an image on a sheet according to an input print job includes a batch control unit configured to supply a plurality of postprocessing apparatuses, which execute postprocessing on a sheet discharged from the image forming apparatus, with a signal for starting a batch power supply to the plurality of postprocessing apparatuses, and a transmission unit configured to transmit an off signal, which is a signal for discontinuing a power supply to a second postprocessing apparatus, which is provided further downstream of a first postprocessing apparatus provided most downstream in a direction of conveying the sheet in the input print job, of the plurality of postprocessing apparatuses, to the first postprocessing apparatus via a communication line for executing a communication between the image forming apparatus and the plurality of postprocessing apparatuses.

According to another aspect of the present invention, an image forming apparatus configured to form an image on a sheet according to an input print job includes a batch control unit configured to supply a plurality of postprocessing apparatuses, which execute processing on a sheet discharged from the image forming apparatus, with a signal for starting a batch power supply to the plurality of postprocessing apparatuses, and a transmission unit configured to transmit an off signal for individually discontinuing a power supply, to the plurality of postprocessing apparatuses connected further downstream of a first postprocessing apparatus, which is provided most downstream in a direction of conveying the sheet in the print job, of the plurality of postprocessing apparatuses, via a communication line for executing a communication between the image forming apparatus and the plurality of postprocessing apparatuses.

According to another aspect of the present invention, an image forming apparatus configured to form an image on a sheet according to an input print job, the image forming apparatus includes a batch control unit configured to supply a plurality of option apparatuses, which are connected to the image forming apparatus in tandem with one another and configured to feed a sheet to the image forming apparatus, with a signal for starting a batch power supply to the plurality of option apparatuses, and a transmission unit configured to transmit an off signal, which is a signal for discontinuing a power supply to a second option apparatus, which is provided further upstream of a first option apparatus provided most upstream in a direction of feeding the sheet to the image forming apparatus in the input print job, among the plurality of option apparatuses, to the first option apparatus via a communication line for executing a communication between the image forming apparatus and the plurality of option apparatuses.

According to another aspect of the present invention, an image forming apparatus configured to form an image on a sheet according to an input print job includes a batch control unit configured to supply a plurality of option apparatuses, which are connected to the image forming apparatus in tandem with one another and configured to feed the sheet to the image forming apparatus, with a signal for starting a batch power supply to the plurality of option apparatuses, and a transmission unit configured to transmit an off signal for individually discontinuing a power supply to the plurality of option apparatuses connected further upstream of a first option apparatus, which is provided most upstream in a direction of feeding the sheet to the image forming apparatus in the print job, among the plurality of option apparatuses, via a communication line for executing a communication between the image forming apparatus and the plurality of option apparatuses.

According to another aspect of the present invention, a postprocessing apparatus configured to execute postprocessing on a sheet discharged from the image forming apparatus having an image which has been formed thereon by an image forming apparatus configured to form an image according to an input print job includes an input unit configured to input a signal for executing a batch power supply to the postprocessing apparatus and to another postprocessing apparatus, which is connected on a downstream side of the postprocessing apparatus in a sheet conveyance direction, and a control unit configured, if the postprocessing apparatus is located most downstream in a direction of conveying a sheet in the input print job, to execute control for discontinuing the power supply to above another postprocessing apparatus after the power is supplied to the postprocessing apparatus according to the signal input by the input unit.

According to another aspect of the present invention, a postprocessing apparatus configured to execute postprocessing on a sheet discharged from the image forming apparatus having an image which has been formed thereon by an image forming apparatus configured to form an image according to an input print job includes an input unit configured to input a signal for executing a batch power supply to the postprocessing apparatus and to yet another postprocessing apparatus, which is connected on an upstream side of the postprocessing apparatus in a sheet conveyance direction, a receiving unit configured, if above another postprocessing apparatus is located most downstream in a direction of conveying the sheet in the print job, to receive an off signal for discontinuing the power supply to the postprocessing apparatus, which is transmitted from the image forming apparatus, and a control unit configured to discontinue the power supply to the printing apparatus, if the off signal is received by the receiving unit after the power is supplied to the printing apparatus according to the signal input by the input unit.

According to another aspect of the present invention, an option apparatus configured to feed a sheet to an image forming apparatus configured to form an image on the sheet according to an input print job includes an input unit configured to input a signal for executing a batch power supply to the option apparatus and to another option apparatus, which is connected on an upstream side of the option apparatus in a direction of feeding the sheet to the image forming apparatus, and a control unit configured, if the option apparatus is located most upstream in a direction of feeding the sheet to the image forming apparatus in the input print job, to execute control for discontinuing the power supply to above another option apparatus after the power is supplied to the option apparatus according to the signal input by the input unit.

According to another aspect of the present invention, an option apparatus configured to feed a sheet to an image forming apparatus configured to form an image on the sheet according to an input print job includes an input unit configured to input a signal for executing a batch power supply to the option apparatus and to yet another option apparatus, which is connected on an upstream side of the option apparatus in a direction of feeding the sheet to the image forming apparatus, a receiving unit configured, if above another option apparatus, among the plurality of option apparatuses, is located most upstream in a direction of feeding the sheet to the image forming apparatus in the print job, to receive an off signal for discontinuing the power supply to the option apparatus, which is transmitted from the image forming apparatus, and a control unit configured, if the off signal is received by the receiving unit after the power is supplied to the printing apparatus according to the signal input by the input unit, to discontinue the power supply to the printing apparatus.

According to another aspect of the present invention, an image forming system including an image forming apparatus, which is configured to form an image on a sheet according to an input print job, and a plurality of postprocessing apparatuses, which are serially connected to the image forming apparatus on a downstream side of the image forming apparatus in a sheet conveyance direction and which is configured to execute postprocessing on a sheet discharged from the image forming apparatus, includes a supply unit configured to supply the plurality of postprocessing apparatuses with a signal, which instructs a batch power supply to the plurality of postprocessing apparatuses, and a control unit configured, after the plurality of postprocessing apparatuses have been powered on by batch processing using the supply unit, to execute control for discontinuing a power supply to a second postprocessing apparatus, which is connected further downstream of a first postprocessing apparatus provided most downstream in a direction of conveying the sheet in the input print job, of the plurality of postprocessing apparatuses.

According to another aspect of the present invention, an image forming system including an image forming apparatus, which is configured to form an image on a sheet according to an input print job, and a plurality of option apparatuses, which are serially connected to the image forming apparatus on an upstream side of the image forming apparatus in a sheet conveyance direction and which are configured to feed a sheet to the image forming apparatus, includes a supply unit configured to supply the plurality of option apparatuses with a signal, which instructs a batch power supply to the plurality of option apparatuses, and a control unit configured, after the plurality of option apparatuses have been powered on by batch processing using the supply unit, to execute control for discontinuing a power supply to a second option apparatus, which is connected further upstream of a first option apparatus provided most upstream in a direction of feeding the sheet in the input print job, of the plurality of option apparatuses.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 1 illustrates an exemplary configuration of the entire image forming system.

FIGS. 4A and 4B are cross sections illustrating an exemplary configuration of a gluing binding machine and a finisher, respectively.

FIG. 11 is a flow chart illustrating an exemplary flow of a power control operation for controlling a power supply to the postprocessing apparatus according to the second exemplary embodiment.

DESCRIPTION OF THE EMBODIMENTS

Figure 2A:
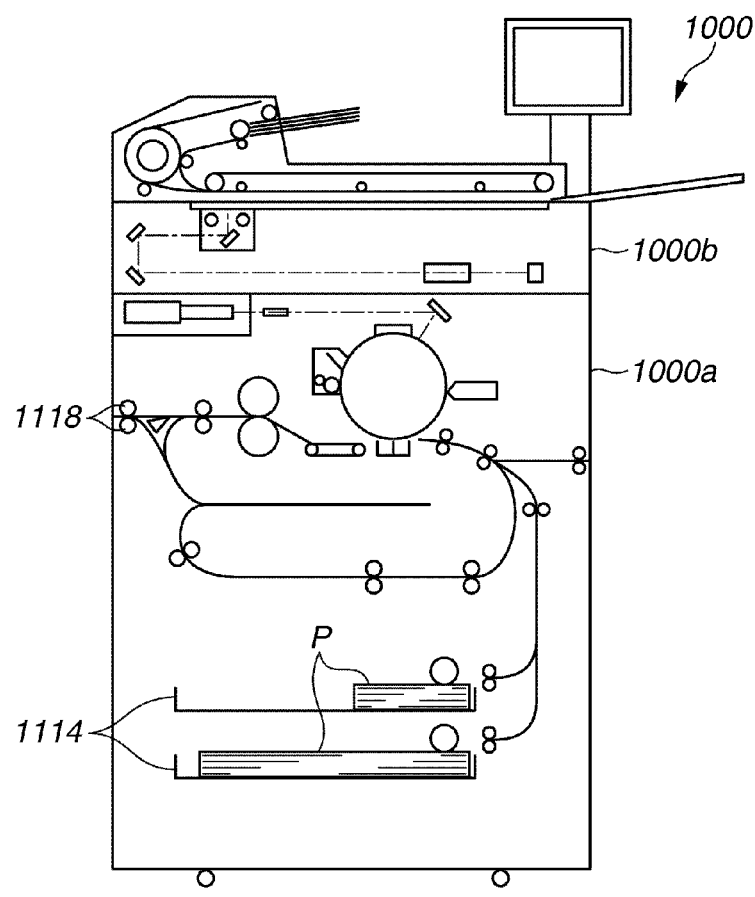
FIGS. 2A and 2B are cross sections illustrating an exemplary configuration of an image forming apparatus and a folding machine.

Various exemplary embodiments, features, and aspects of the invention will be described in detail below with reference to the drawings.

FIG. 1 illustrates an exemplary configuration of the entire image forming system according to a first exemplary embodiment of the present invention.

Referring to FIG. 1, the image forming system includes an image forming apparatus 1000 and a plurality of postprocessing apparatuses, which is connected to the image forming apparatus 1000. The plurality of postprocessing apparatuses includes a finisher 500, a gluing binding machine 600, sheet stacking apparatuses 700 and 800, and a folding machine 900.

The plurality of postprocessing apparatuses 500 through 900 is serially connected to the image forming apparatus 1000 on the downstream side thereof in the conveyance direction of the sheet discharged from the image forming apparatus 1000.

Each of the postprocessing apparatuses 500 through 900 includes a function for executing postprocessing on a sheet discharged from the image forming apparatus 1000 and a function for conveying the sheet to a downstream postprocessing apparatus. The postprocessing apparatuses 500 through 800 include a function for stacking the sheet.

Figure 2B:
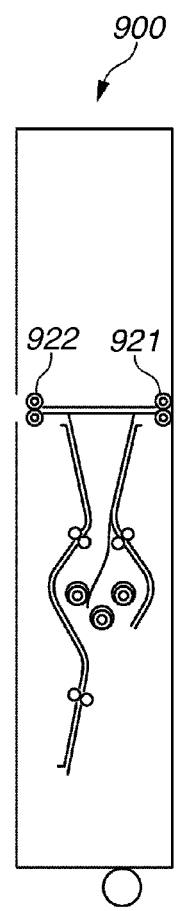

FIG. 2A is a cross section of the image forming apparatus 1000 illustrating an exemplary configuration thereof. FIG. 2B is a cross section illustrating an exemplary configuration of the folding machine 900.

The image forming apparatus 1000 includes an image forming unit 1000a and an image reading unit 1000b. An image of a document read by 100B or an image transmitted from a computer is formed by the image forming unit 1000a on a sheet P, which is fed from a cassette 1114. In addition, the image forming apparatus 1000 discharges the sheet P having the image formed thereon to the folding machine 900 by using the discharge roller pair 1118.

The folding machine 900 can fold the sheet P discharged from the image forming apparatus 1000. Furthermore, in executing postprocessing except the folding on the sheet P, the sheet P is discharged onto the sheet stacking apparatus 800, which is provided downstream of the folding machine 900 in the conveyance direction for conveying the sheet P, by using a discharge roller pair 922.

The configuration and the operation of the image forming apparatus 1000 and the folding machine 900 are publicly known. Accordingly, the detailed description thereof will be omitted here.

Figure 3:
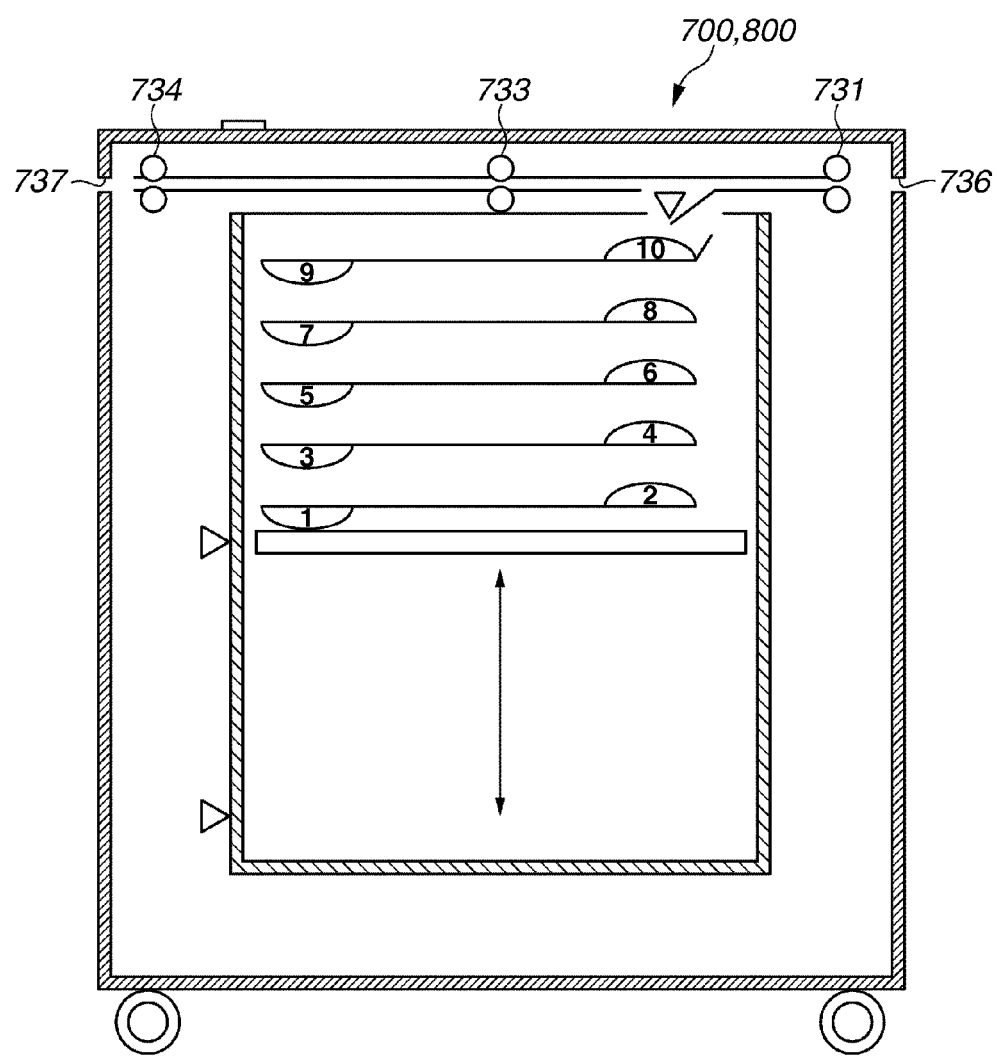
FIG. 3 is a cross section illustrating an exemplary configuration of a sheet stacking apparatus.

FIG. 3 is a cross section illustrating an exemplary configuration of sheet stacking apparatuses 700 and 800.

The sheet stacking apparatus 800 conveys the sheet P discharged from the folding machine 900 by using an inlet roller pair 731. The sheet P is then stacked within the sheet stacking apparatus 800.

If the sheet P is not to be stacked within the sheet stacking apparatus 800, the sheet stacking apparatus 800 conveys the sheet P discharged from the folding machine 900 by using the inlet roller pair 731 and the conveyance roller pair 733. Then the sheet P is discharged from the discharge port 737 onto the sheet stacking apparatus 700, which is provided downstream of the folding machine 900 in the conveyance direction for conveying the sheet P, by using a discharge roller pair 734.

Moreover, if the sheet P is not to be stacked within the sheet stacking apparatus 700, the sheet P discharged from the sheet stacking apparatus 800 is discharged to the gluing binding machine 600, which is provided downstream of the sheet stacking apparatuses 700 and 800 in the conveyance direction for conveying the sheet P.

The configuration and the operation of the sheet stacking apparatuses 700 and 800 are publicly known. Accordingly, the detailed description thereof will be omitted here.

FIG. 4A is a cross section illustrating an exemplary configuration of the gluing binding machine 600. FIG. 4B is a cross section illustrating an exemplary configuration of the finisher 500.

The gluing binding machine 600 conveys the sheet P discharged from the sheet stacking apparatus 700 by using a feed roller pair 625. After stacking the sheet P on a buffer unit 622 by a designated quantity, the gluing binding machine 600 glues and binds a bundle of the sheets P and a cover together into a book.

The book-bound sheet bundle is stacked onto the stack tray 630 included in the gluing binding machine 600.

In addition, if the sheets P are not to be bound into a book, the sheet P discharged from the sheet stacking apparatus 700 is discharged to the finisher 500, which is provided downstream of the gluing binding machine 600 in the conveyance direction for conveying the sheet P, by using the feed roller pair 625, conveyance roller pairs 620, 621, 623, and 624, and the discharge roller pair 635.

During the above-described operation, power is supplied only to motors that drive the feed roller pair 625, the conveyance roller pairs 620, 621, 623, and 624, and the discharge roller pair 635, and power is not supplied to components related to binding.

The finisher 500 staples and binds the sheet P discharged from the gluing binding machine 600 of the quantity designated by the user with a staple. Subsequently, the finisher 500 stacks a resulting stapled sheet bundle onto trays 521 through 523.

The configuration and the operation of the gluing binding machine 600 and the finisher 500 are publicly known. Accordingly, the detailed description thereof will be omitted here.

In examples illustrated in FIGS. 2A, 2B, 3, 4A, and 4B, vertical positions of an inlet and an outlet are the same in each postprocessing apparatus. Accordingly, the sheet P discharged from the image forming apparatus 1000 is conveyed to each of the postprocessing apparatuses 500, 600, 700, 800, and 900 along an almost horizontal conveyance direction.

As described above, in a postprocessing apparatus that does not execute postprocessing on the sheet P, power is supplied only to a motor that drives a roller pair configured to convey the sheet P. With the above-described configuration, the postprocessing apparatus that does not execute postprocessing on the sheet P can discharge the sheet P to another postprocessing apparatus provided downstream thereof in the sheet conveyance direction.

Figure 5:
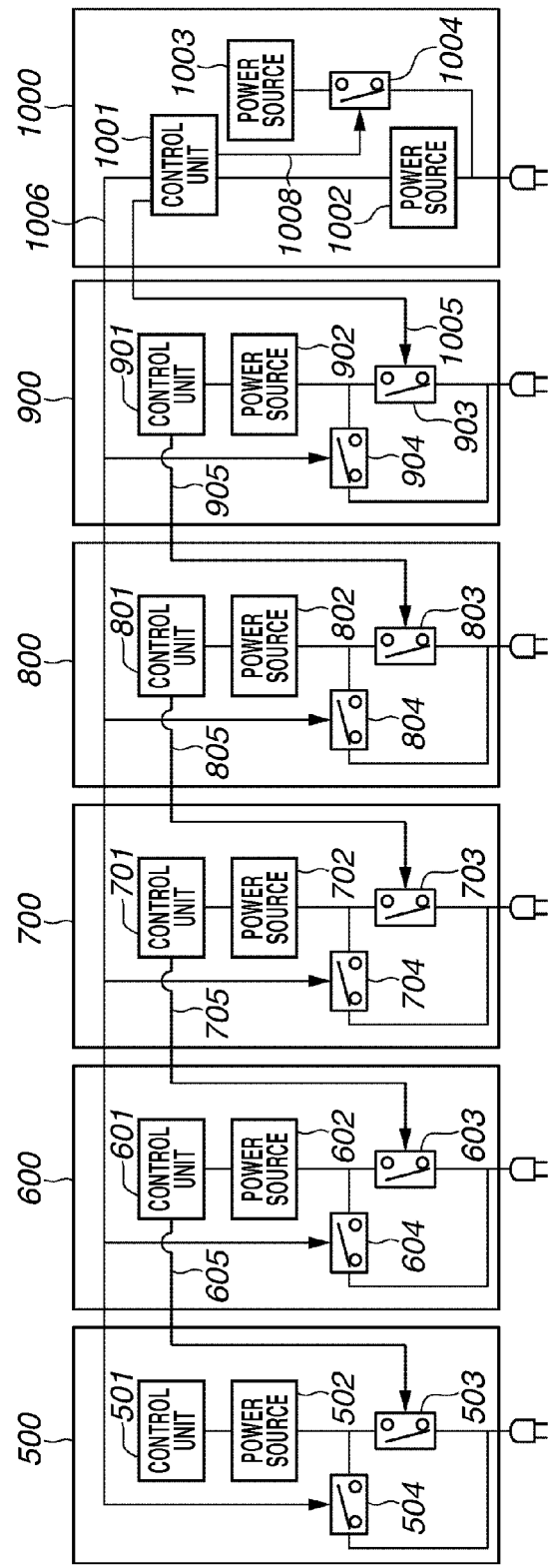
FIG. 5 is a schematic circuit diagram illustrating an exemplary method for connecting a power control line according to a first exemplary embodiment of the present invention.

FIG. 5 is a schematic circuit diagram illustrating an exemplary method for connecting a power control line.

Referring to FIG. 5, the image forming apparatus 1000 includes a control unit 1001, a power supply unit 1002, and a power supply unit 1003. The power supply unit 1002 is configured to convert alternate current (AC) power into direct current (DC) power to supply power to the control unit 1001. The power supply unit 1003 is configured to supply power to various motors and solenoids used during image forming.

In addition, the image forming apparatus 1000 includes a load power control relay 1004. The load power control relay 1004 starts and discontinues the supply of AC power to the power supply unit 1003 according to a signal from the control unit 1001.

The postprocessing apparatuses 500, 600, 700, 800, and 900 include power units 502, 602, 702, 802, and 902, which are configured to convert the AC power into the DC power to supply power to control units 501, 601, 701, 801, and 901, respectively. In addition, the postprocessing apparatuses 500, 600, 700, 800, and 900 include batch power control relays 504, 604, 704, 804, and 904 and individual power control relays 503, 603, 703, 803, and 903. All of the batch power control relays 504, 604, 704, 804, and 904 and the individual power control relays 503, 603, 703, 803, and 903 have the same configuration.

Each of the postprocessing apparatuses 500, 600, 700, 800, and 900 is connected to the image forming apparatus 1000 via a batch power control line 1006. The batch power control relays 504, 604, 704, 804, and 904 are driven via the batch power control line 1006, which is connected to the image forming apparatus 1000, in starting or discontinuing the supply of AC power to the power units 502, 602, 702, 802, and 902.

In addition, the individual power control relays 503, 603, 703, 803, and 903 are driven by individual power control lines 605 through 1005, which are connected to the postprocessing apparatus or the image forming apparatus upstream of the apparatus in the sheet conveyance direction, in starting or discontinuing the supply of AC power to the power units 502, 602, 702, 802, and 902.

Both the individual power control relay 503, 693, 703, 803, or 903 and the batch power control relays 504, 604, 704, 804, or 904 are continued (conducted) when power is supplied thereto and are opened when the power supply thereto is discontinued.

The image forming apparatus 1000 executes control for turning on and off all the postprocessing apparatuses by using the batch power control line 1006. In addition, the postprocessing apparatuses 600, 700, 800, and 900 execute control for turning on and off the postprocessing apparatus provided adjacent thereto on the downstream side thereof by using individual power control lines 705, 805, 905, and 1005, respectively.

Figure 6:
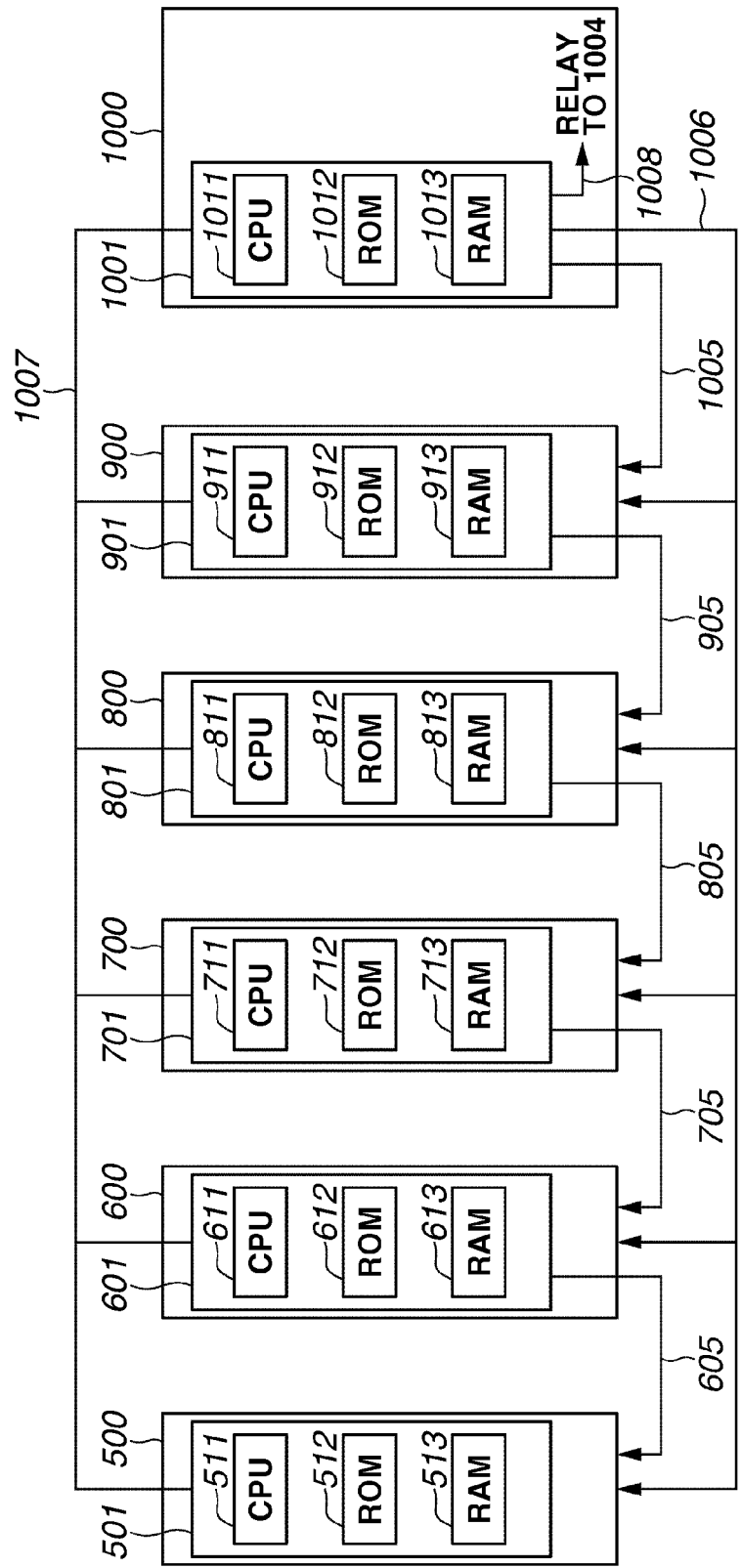
FIG. 6 is a control block diagram of the image forming system according to the first exemplary embodiment.

FIG. 6 is a control block diagram of the image forming system according to the present exemplary embodiment.

Referring to FIG. 6, the control unit 1001 of the image forming apparatus 1000 includes a central processing unit (CPU) 1011, a read-only memory (ROM) 1012, and a random access memory (RAM) 1013.

The control units 501, 601, 701, 801, and 901 included in the postprocessing apparatuses 500, 600, 700, 800, and 900 include CPUs 511, 611, 711, 811, and 911, ROMs 512, 612, 712, 812, and 912, and RAMS 513, 613, 713, 813, and 913, respectively.

The CPU 1011 controls the operation of each component of the image forming apparatus 1000 and executes the above-described image forming. In addition, the CPU 1011 transmits a command for controlling the power supply, to each of the postprocessing apparatuses 500, 600, 700, 800, and 900.

The CPUs 511, 611, 711, 811, and 911 control the operation of the components of each of the postprocessing apparatuses 500, 600, 700, 800, and 900. In addition, the CPUs 511, 611, 711, 811, and 911 control the supply of power to a downstream postprocessing apparatus, which is provided on the downstream side of each postprocessing apparatus.

The ROMs 512, 612, 712, 812, 912, and 1012 previously store a control program to be executed by the CPUs 511, 611, 711, 811, 911, and 1011. The RAMs 513, 613, 713, 813, 913, and 1013 function as a work area for the CPUs 511, 611, 711, 811, 911, and 1011 to be used in executing the program.

A communication line 1007 is a communication line for transmitting and receiving data necessary for various operations among the CPU 1011 of the image forming apparatus 1000 and the CPU 511, 611, 711, 811, or 911 of each postprocessing apparatus.

Each of the CPUs 511, 611, 711, 811, 911, and 1011 executes a communication by a token passing method. The CPU 1011 inputs an instruction for turning on or off the individual power control relays 503, 603, 703, and 803 via the communication line 1007.

The control unit 1001 of the image forming apparatus 1000 outputs a signal for driving the load power control relay 1004, which is included in the image forming apparatus 1000, via a individual power control line 1008. In addition, the control unit 1001 outputs a signal for driving a individual power control relay 903 of the postprocessing apparatus 900, which is connected to the image forming apparatus 1000 on the downstream side of the image forming apparatus 1000 in the sheet conveyance direction via the individual power control line 1005.

In addition, the CPU 1011 outputs a signal for driving the batch power control relays 504, 604, 704, 804, and 904 of the postprocessing apparatuses 500, 600, 700, 800, and 900 via the batch power control line 1006.

Each of the control units 501, 601, 701, 801, and 901 of the postprocessing apparatuses 500, 600, 700, 800, and 900 outputs a signal for driving the individual power control relays 503, 603, 703, and 803 of the postprocessing apparatuses 500, 600, 700, and 800, which are connected to the image forming apparatus 1000 on the downstream side of the image forming apparatus 1000 according to a signal transmitted from the image forming apparatus 1000 via the communication line 1007.

Figure 7:
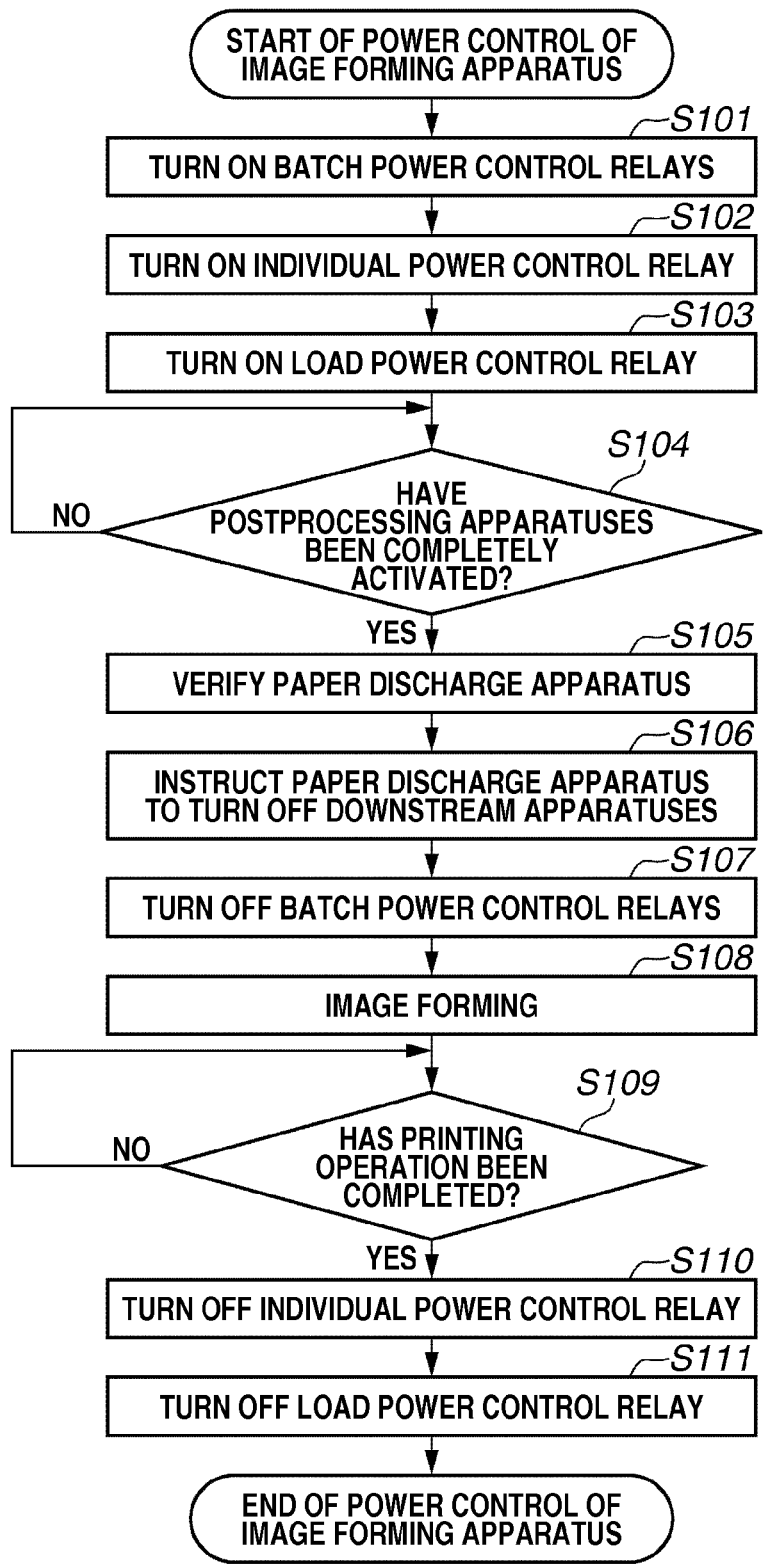
FIG. 7 is a flow chart illustrating an exemplary flow of a power control operation for controlling a power supply to the image forming apparatus according to the first exemplary embodiment.

An exemplary power control operation executed within the image forming system according to the present exemplary embodiment will be described in detail below. FIG. 7 is a flow chart illustrating an exemplary flow of a power control operation for controlling a power supply to the image forming apparatus 1000 according to the present exemplary embodiment when an image forming system is performing a printing operation to form an image on a sheet.

The power control operation is executed by the CPU 1011 included in the image forming apparatus 1000 when an image of a document is read by the image reading unit 1000b or when image data is received from a computer. A program for the power control operation is previously stored on the ROM 1012.

Referring to FIG. 7, in step S101, the CPU 1011 turns on the batch power control relays 504, 604, 704, 804, and 904 via the batch power control line 1006. In step S102, the CPU 1011 turns on the individual power control relay 903 of the folding machine 900, which is connected to the image forming apparatus 1000 on the downstream side of the image forming apparatus 1000 in the sheet conveyance direction via the individual power control line 1005.

The individual power control relay 903 is turned on in step S102 because the supply of power to the postprocessing apparatus 900, which is directly connected to the image forming apparatus 1000, is controlled by the control unit 1001 of the image forming apparatus 1000.

By executing the processing in step S102, even when the supply of power to at least one of the postprocessing apparatuses 500, 600, 700, and 800, except the postprocessing apparatus 900 is discontinued, if the batch control relay 904 is turned off after the individual power control relay 903 is turned on, the power supply to the control unit 901 is continued in the postprocessing apparatus 900.

In step S103, the CPU 1011 turns on the load power control relay 1004 via the individual power control line 1008 and activates the power unit 1003, which is necessary during a print operation.

Subsequently, in step S104, the CPU 1011 determines whether each of the postprocessing apparatuses 500, 600, 700, 800, and 900 has been completely activated. If it is determined that any of the postprocessing apparatuses 500, 600, 700, 800, and 900 has not been completely activated yet (No in step S104), then the CPU 1011 repeats the processing in step S104 and waits until all the postprocessing apparatuses 500, 600, 700, 800, and 900 are completely activated. More specifically, the determination in step S104 as to whether the postprocessing apparatuses 500, 600, 700, 800, and 900 have been completely activated is made according to a signal from the postprocessing apparatuses 500, 600, 700, 800, and 900, which is transmitted via the communication line 1007.

In step S105, the CPU 1011 verifies a postprocessing apparatus designated as a final discharge destination of the sheet P output by the print operation.

On the other hand, if it is determined that all the postprocessing apparatuses 500, 600, 700, 800, and 900 have been completely activated (YES in step S104), then the processing advances from step S105 to step S106. In step S106, the CPU 1011 inputs an instruction to the postprocessing apparatus, which has been verified in step S105 as a postprocessing apparatus that is the final discharge destination of the sheet P, for turning off the individual power control relay of the postprocessing apparatus connected adjacently to the sheet final destination postprocessing apparatus on the downstream side thereof in the conveyance direction for conveying the sheet P via the communication line 1007.

The processing in step S106 can be omitted if the final output destination postprocessing apparatus is connected on the most downstream portion in the sheet conveyance direction (i.e., the postprocessing apparatus 500 in the present exemplary embodiment).

In step S107, the CPU 1011 turns off the batch power control relays 504, 604, 704, 804, and 904 via the batch power control line 1006. In step S108, the CPU 1011 starts forming the image on the sheet to start an instructed print operation. In the present exemplary embodiment, a "print operation" refers to an operation from forming an image on the sheet by the image forming apparatus 1000 to outputting the sheet after postprocessing by the postprocessing apparatuses 500, 600, 700, 800, and 900.

In step S109, the CPU 1011 determines whether the print operation has been completed. If it is determined that the print operation has not been completed yet (NO in step S109), then the CPU 1011 repeats the processing in step S109 and waits until the print operation is completed. More specifically, the CPU 1011 determines that the print operation has been completed if a signal indicating that the sheet P has been completely discharged, which is transmitted from the postprocessing apparatus that is the final discharge destination of the sheet P, via the communication line 1007, is received.

If it is determined that the print operation has been completed (YES in step S109), then the processing advances to step S110. In step S110, the CPU 1011 turns off the individual power control relay 903 of the postprocessing apparatus 900 via the individual power control line 1005. Because the batch power control relay 904 has already been turned off in step S110, no power is supplied to the CPU 911 if the individual power control relay 903 is turned off.

As a result, the CPU 911 becomes inoperable. In other words, in this state, the individual power control relay 803 of the postprocessing apparatus 800, which is connected to the postprocessing apparatus 900 downstream of the postprocessing apparatus 900 in the sheet conveyance direction, cannot keep being powered on.

If the individual power control relay 803 of the postprocessing apparatus 800 is turned off, power is not supplied to the CPU 811. Accordingly, the individual power control relay 703 of the postprocessing apparatus 700 is also turned off.

In step S111, the CPU 1011 turns off the load power control relay 1004 via the individual power control line 1008 and discontinues the driving of the power unit 1003. Then the power control operation ends.

As described above, if the image forming apparatus 1000 turns off the individual power control relay 903, then the individual power control relays of the postprocessing apparatuses connected to the image forming apparatus 1000 on the downstream side of the image forming apparatus 1000 in the sheet conveyance direction are serially turned off. As a result, all the postprocessing apparatuses are powered off.

With the above-described configuration, in the present exemplary embodiment, the power consumption of the postprocessing apparatuses 500, 600, 700, 800, and 900 during a standby mode, i.e., during a time period after the end of the print operation by the CPU 1011 and before a next print operation is started, can be effectively reduced.

Figure 8:
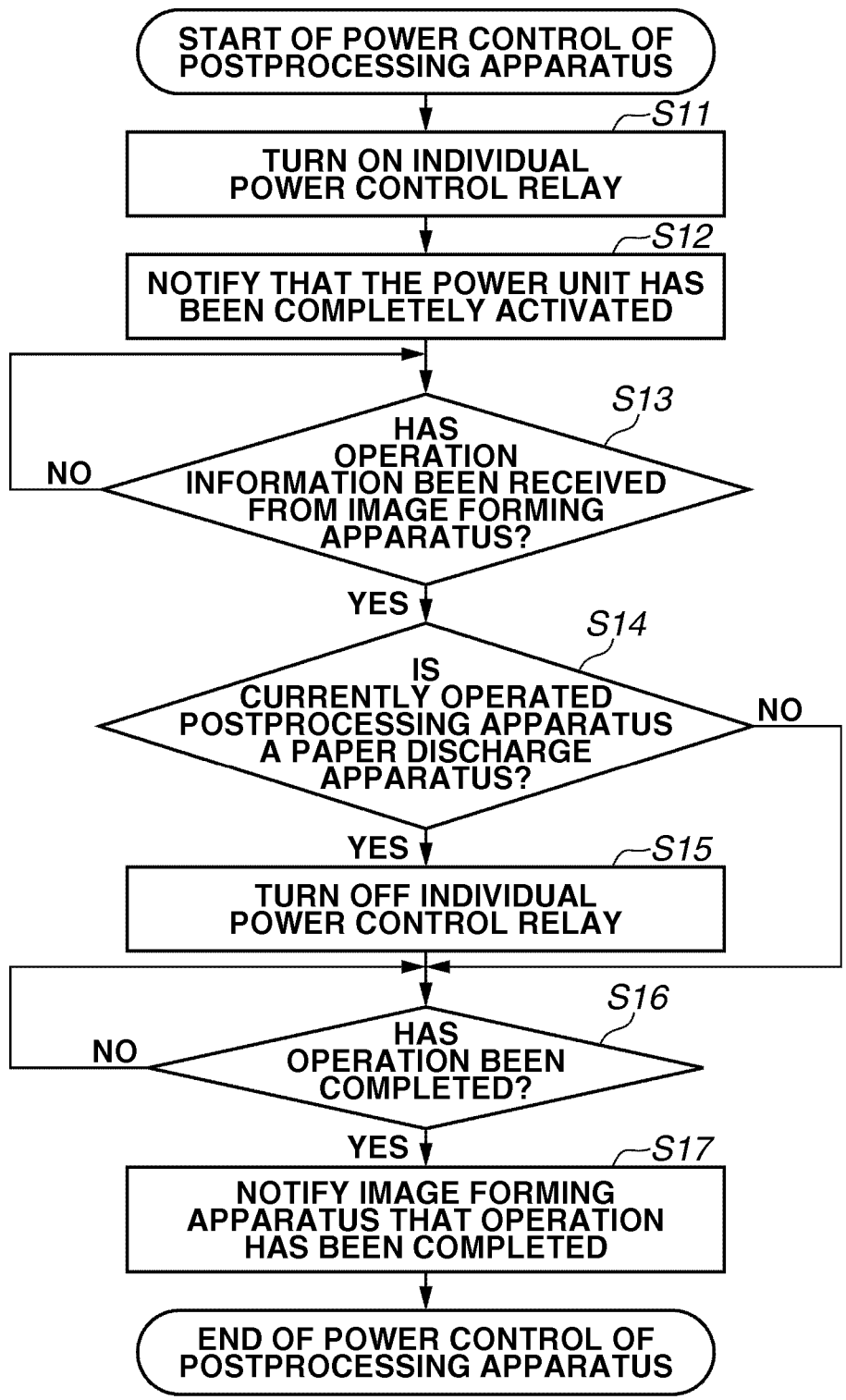
FIG. 8 is a flow chart illustrating an exemplary flow of a power control operation for controlling a power supply to the postprocessing apparatus according to the first exemplary embodiment.

FIG. 8 is a flow chart illustrating an exemplary flow of a power control operation for controlling the power supply to each of the postprocessing apparatuses 500 through 900, which is executed when the image forming system performs a print operation. The power control operation is executed by the CPUs 511 through 911 of the postprocessing apparatuses 500 through 900 after the postprocessing apparatuses 500 through 900 has been activated by turning on the batch power control relays 504 through 904 in step S101 (FIG. 7) at the start of a print operation.

Since the postprocessing apparatuses 500 through 900 execute the same operation, the postprocessing apparatus 600 will be described as a typical apparatus of the postprocessing apparatuses 500 through 900, to describe the operation thereof. Therefore, the operation of the postprocessing apparatuses 500, 700, 800, and 900 will not be particularly described below. A program implementing the operation is previously stored on the ROM 612 included in the control unit 601 and is executed by the CPU 611.

Referring to FIG. 8, in step S11, the CPU 611 turns on the individual power control relay 503 of the postprocessing apparatus 500, which is connected to the postprocessing apparatus 600 on the downstream side of the postprocessing apparatus 600 in the conveyance direction, via the individual power control line 605.

In step S12, the CPU 611 notifies that the power unit 602 has been completely activated to the image forming apparatus 1000 via the communication line 1007. In step S13, the CPU 611 determines whether an operation command is transmitted from the image forming apparatus 1000 and waits until an operation command is received.

If it is determined that an operation command has been received from the image forming apparatus 1000 (YES in step S13), then the processing advances to step S14. In step S14, the CPU 611 determines whether the postprocessing apparatus 600 is the postprocessing apparatus that is the discharge destination of the sheet P according to the received operation command.

If it is determined that the postprocessing apparatus 600 has been designated as the postprocessing apparatus that is the discharge destination of the sheet P (YES in step S14), then the processing advances to step S15. In step S15, the CPU 611 turns off the individual power control relay 503 of the postprocessing apparatus 500, which is connected to the postprocessing apparatus 600 adjacent thereto on the downstream side of the postprocessing apparatus 600 in the conveyance direction, via the individual power control line 605.

In step S16, the CPU 611 determines whether the sequential processing including the postprocessing and stacking has been completed and waits until the sequence ends.

On the other hand, if it is determined that the postprocessing apparatus 600 is not the postprocessing apparatus that is the discharge destination of the sheet P (NO in step S14), then the processing advances to step S16. If it is determined that the sequence of postprocessing and stacking has been completed (YES in step S16), then the processing advances to step S17. In step S17, the CPU 611 transmits a signal for notifying the image forming apparatus 1000 that the sheet P has been completely discharged, via the communication line 1007. Then the processing ends.

In the present exemplary embodiment, after the CPU 1011 has turned on the batch power control relays 504 through 904, the batch power control relays 504, 604, 704, 804, and 904 are turned off when individual power control relay 503 of the postprocessing apparatus 500 is turned off. The postprocessing apparatus 500 is provided adjacent to and downstream of the postprocessing apparatus 600 which is the discharge destination of the sheet P.

With the above-described configuration, in the present exemplary embodiment, the CPU 1011 can discontinue the supply of power to the postprocessing apparatus 500, which is provided on the downstream side of the postprocessing apparatus 600, which is the discharge destination of the sheet P. In other words, according to the present exemplary embodiment having the above-described configuration, the supply of power to a specific postprocessing apparatus can be automatically discontinued during a print operation even if the number of power control lines that connect the image forming apparatus and the plurality of postprocessing apparatuses is less than the total number of postprocessing apparatuses connected to the image forming apparatus in the image forming system. Accordingly, the present exemplary embodiment can achieve a high power saving effect.

In addition, in the present exemplary embodiment, if the power supply to one postprocessing apparatus has been discontinued, the supply of power to the postprocessing apparatus provided downstream of one postprocessing apparatus is discontinued because the individual power control relay of the postprocessing apparatus provided downstream of one postprocessing apparatus cannot be kept turned on.

To paraphrase this, the present exemplary embodiment can automatically suspend the supply of power to the postprocessing apparatus that is not used in discharging the sheet by controlling the sheet discharge destination postprocessing apparatus to suspend the power supply to the downstream apparatus.

A second exemplary embodiment differs from the above-described first exemplary embodiment in the following points. The other configurations of the present exemplary embodiment are the same as those of the first exemplary embodiment. Accordingly, the detailed description thereof will not be repeated here.

In the first exemplary embodiment, the CPU of the postprocessing apparatus that is the discharge destination of the sheet P turns off the individual power control relay of the downstream postprocessing apparatus via the individual power control line. The individual power control line is provided between one postprocessing apparatus and the postprocessing apparatus, which is provided on the downstream side of the postprocessing apparatus in the conveyance direction. With this configuration, the first exemplary embodiment powers off all the postprocessing apparatuses provided on the downstream side of the sheet discharge destination postprocessing apparatus.

In the present exemplary embodiment, all postprocessing apparatuses provided downstream of a postprocessing apparatus that is the discharge destination of the sheet P are powered off by the CPU of each downstream postprocessing apparatus by turning off the individual power control relay of each downstream postprocessing apparatus.

Figure 9:
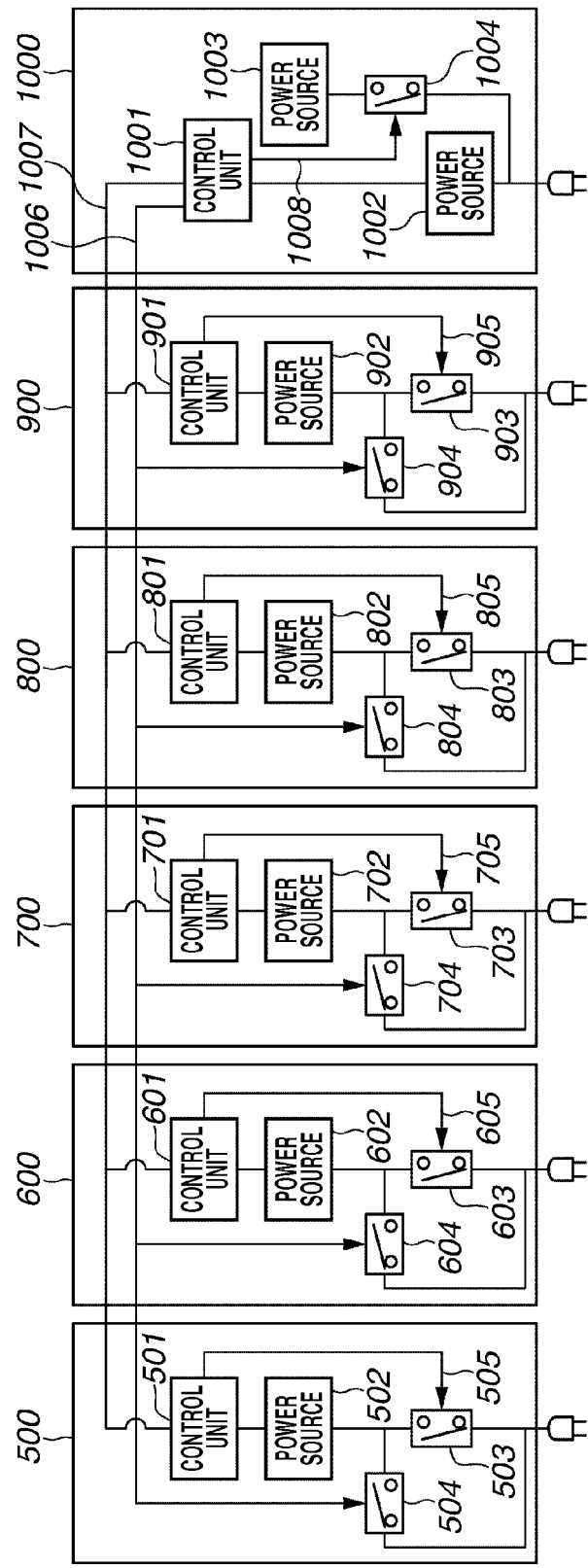
FIG. 9 is a control block diagram of an image forming system according to a second exemplary embodiment of the present invention.

FIG. 9 is a control block diagram of an image forming system according to the present exemplary embodiment. Referring to FIG. 9, the communication line 1007 is a communication line for transmitting a command from the control unit 1001 of the image forming apparatus 1000 for controlling a state of power supply to each of the postprocessing apparatuses 500 through 900, which are provided downstream of the image forming apparatus 1000. The communication via the communication line 1007 is executed by the token passing method.

The control unit 1001 of the image forming apparatus 1000 transmits and receives data necessary for executing various operations to and from each of the postprocessing apparatuses 500 through 900 via the communication line 1007. In addition, the control unit 1001 outputs a signal for driving the batch power control relays 504, 604, 704, 804, and 904 of the postprocessing apparatuses 500, 600, 700, 800, and 900 via the batch power control line 1006.

Each of the control units 601 through 901 of the postprocessing apparatuses 600 through 900 executes control for turning on and off each corresponding individual power control relay 503, 603, 703, 803, or 903 according to the signal transmitted from the image forming apparatus 1000 via the communication line 1007.

Figure 10:
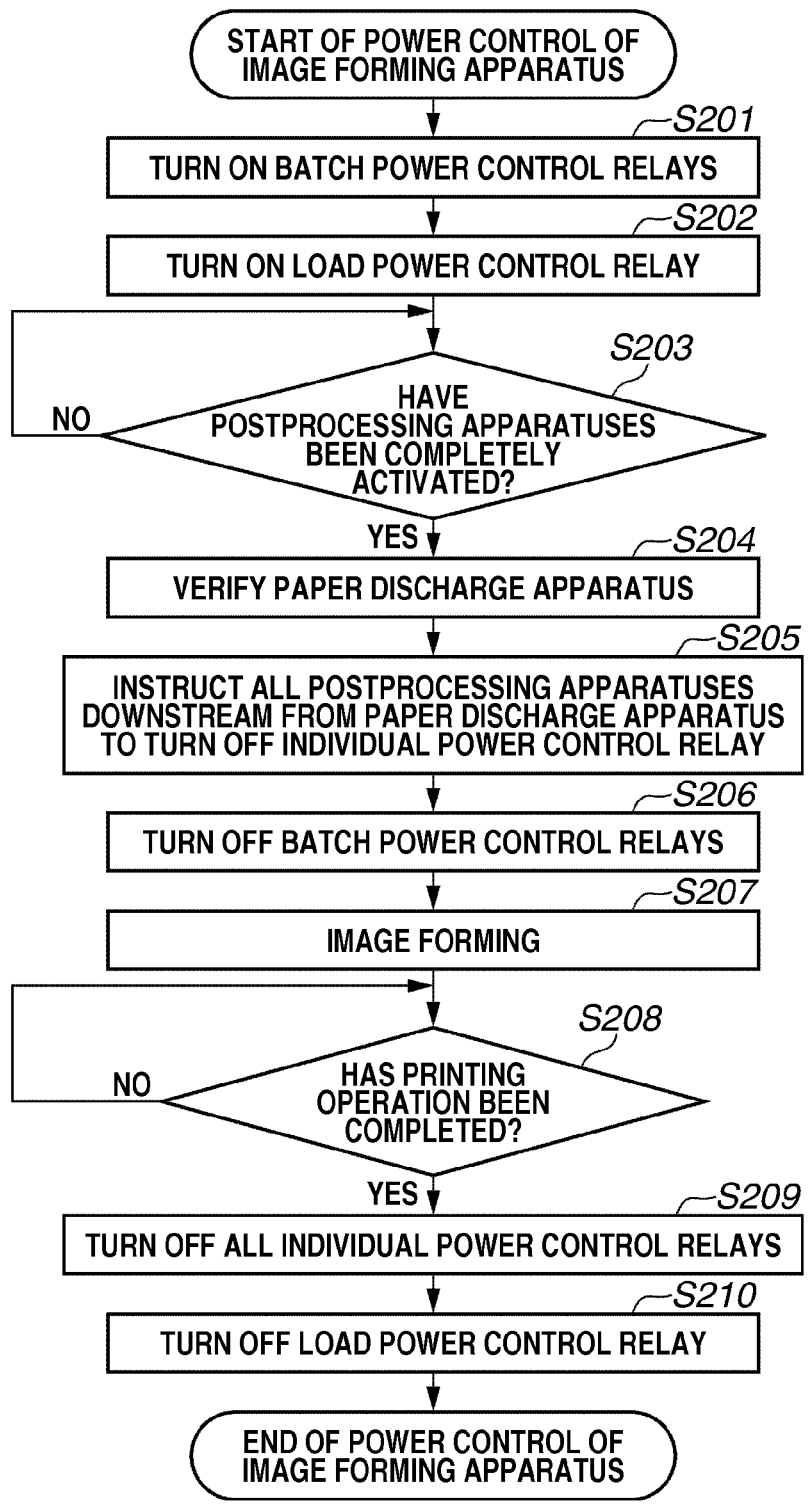
FIG. 10 is a flow chart illustrating an exemplary flow of a power control operation for controlling a power supply to the image forming apparatus according to the second exemplary embodiment.

An exemplary operation for controlling the power supply executed within the image forming system according to the present exemplary embodiment will be described in detail below. FIG. 10 is a flow chart illustrating an exemplary flow of a power control operation for controlling a power supply to the image forming apparatus 1000, which is executed when the image forming system executes a print operation.

The operation illustrated in FIG. 10 is executed by the CPU 1011 of the image forming apparatus 1000 when a print operation (image forming operation) is started. A program for the power control operation is previously stored on the ROM 1012 of the control unit 1001.

Referring to FIG. 10, in step S201, the CPU 1011 turns on the batch power control relays 504, 604, 704, 804, and the batch control relay 904 of all the postprocessing apparatuses 500 through 900, which are connected to the image forming apparatus 1000, via the batch power control line 1006. In step S202, the CPU 1011 turns on the load power control relay 1004 via the individual power control line 1008 to activate the power unit 1003, which is necessary for executing the print operation.

In step S203, the CPU 1011 determines whether the postprocessing apparatuses 500 through 900 have been completely activated. If it is determined that the postprocessing apparatuses 500 through 900 have not been completely activated yet (NO in step S203), then the CPU 1011 repeats the processing in step S203 and waits until the postprocessing apparatuses 500 through 900 are completely activated.

Whether the postprocessing apparatuses 500 through 900 have been completely activated is determined according to the signal from each of the postprocessing apparatuses 500 through 900, which is transmitted via the communication line 1007.

In step S204, the CPU 1011 verifies the postprocessing apparatus designated as the final discharge destination of the sheet P, which is to be output by the print operation. In step S205, the CPU 1011 inputs, via the communication line 1007, an instruction for turning off the individual power control relay to each postprocessing apparatus connected to the postprocessing apparatus verified in step S204 which is the discharge destination of the sheet P, on the downstream side of the verified postprocessing apparatus.

If the postprocessing apparatus that is the final discharge destination of the sheet P is a postprocessing apparatus provided most downstream in the sheet conveyance direction (i.e., the postprocessing apparatus 500 in the present exemplary embodiment), the processing in step S205 can be omitted.

In step S206, the CPU 1011 turns off the batch power control relays 504, 604, 704, 804, and 904 via the batch power control line 1006. In step S207, the CPU 1011 starts forming an image on the sheet to start the print operation.

In step S208, the CPU 1011 determines whether the print operation has been completed. If it is determined that the print operation has not been completed yet (NO in step S208), then the CPU 1011 repeats the processing in step S208 and waits until the print operation is completed.

More specifically, the CPU 1011 determines that the print operation has been completed according to a signal transmitted from the postprocessing apparatus that is the discharge destination of the sheet P via the communication line 1007, which indicates that the sheet P has been completely discharged. If it is determined that the print operation has been completed (YES in step S208), then the processing advances to step S209.

In step S209, the CPU 1011 turns off the individual power control relays 503, 603, 703, 803, and 903 of all the postprocessing apparatuses 500, 600, 700, 800, and 900 via the batch power control line 1006. Because the batch power control relays 504, 604, 704, 804, and 904 have already been turned off in step S209 in this state, if the individual power control relays 503, 603, 703, 803, and 903 are turned off, the power supply to the power units 505, 605, 705, 805, and 905 stops.

In step S210, the CPU 1011 turns off the load power control relay 1004 via the individual power control line 1008 and stops the driving of the power unit 1003. Then the power control operation ends.

FIG. 11 is a flow chart illustrating an exemplary flow of a power control operation for controlling a power supply to each of the postprocessing apparatuses 500 through 900, which is executed when the image forming system executes a print operation.

The power control operation illustrated in FIG. 11 is executed by each of the CPUs 511 through 911 included in the postprocessing apparatuses 500 through 900 after the postprocessing apparatuses 500 through 900 are activated by turning on the batch power control relays 504 through 904 in step S201 (FIG. 10) at the start of the print operation.

Because the postprocessing apparatuses 500 through 900 execute the same operation, the operation for discharging the sheet P on the postprocessing apparatus 600 will be described as the typical operation. The operation for controlling the power supply to the postprocessing apparatus 600 is executed by the CPU 611 by reading and executing an operation program from the ROM 612.

Referring to FIG. 11, in step S31, the CPU 611 turns on the individual power control relay 603 via the individual power control line 605. In step S32, the CPU 611 notifies the image forming apparatus 1000 that the power unit 602 has been completely activated via the communication line 1007.

In step S33, the CPU 611 waits until an operation command is transmitted from the image forming apparatus 1000. In other words, in step S33, the CPU 611 determines whether an operation command has been received from the image forming apparatus 1000. If it is determined that an operation command has been received from the image forming apparatus 1000 (YES in step S33), then the processing advances to step S34.

In step S34, the CPU 611 determines whether a signal instructing powering off of the postprocessing apparatus 600 has been received from the CPU 1011 via the communication line 1007. More specifically, the signal instructing powering off the postprocessing apparatus 600 refers to a signal instructing turning off the individual power control relay 603, which is transmitted from the CPU 1011 of the image forming apparatus 1000.

If it is determined that no signal for powering off the postprocessing apparatus 600 has been received (NO in step S34), then the processing advances to step S35. In step S35, the CPU 611 waits until a series of postprocessing and the sheet stacking operation end while keeping the individual power control relay 603 turned on. In other words, in step S35, the CPU 611 determines whether the series of postprocessing and the sheet stacking operation have been completed.

If it is determined that the series of postprocessing and the sheet stacking operation have been completed (YES in step S35), then the processing advances to step S36. In step S36, the CPU 611 transmits a signal indicating that the sheet P has been completely discharged to the image forming apparatus 1000 via the communication line 1007. In step S37, the CPU 611 waits until a signal that instructs powering off the postprocessing apparatus 600 is transmitted from the CPU 1011 via the communication line 1007. To paraphrase this, in step S37, the CPU 611 determines whether a signal that instructs powering off the postprocessing apparatus 600 has been received from the CPU 1011 via the communication line 1007.

If it is determined that a signal that instructs powering off the postprocessing apparatus 600 has been received (YES in step S37), then the processing advances to step S38. In step S38, the CPU 611 turns off the individual power control relay 603 via the individual power control line 605. Then the operation for controlling the power supply to the postprocessing apparatus 600 ends.

On the other hand, if it is determined that a signal for powering off the postprocessing apparatus 600 has been received (YES in step S34), then the processing advances to step S38. In step S38, the CPU 611 turns off the individual power control relay 603 via the individual power control line 605. Then the operation for controlling the power supply to the postprocessing apparatus 600 ends.

In the present exemplary embodiment, after the batch power control relays 504, 604, 704, 804, and 904 have been turned on by the CPU 1011, the power supply to all the postprocessing apparatuses that are provided on the downstream side of the postprocessing apparatus 700 in the sheet conveyance direction, which is the discharge destination of the sheet P, is discontinued. Accordingly, in the present exemplary embodiment, only the batch power control line 1008 is used as the power control line that connects the image forming apparatus 1000 with the postprocessing apparatuses 500, 600, 700, 800, and 900.

In other words, according to the present exemplary embodiment having the above-described configuration, the supply of power to a specific postprocessing apparatus can be automatically discontinued during a print operation even if the number of power control lines that connect the image forming apparatus and the plurality of postprocessing apparatuses is less than the total number of postprocessing apparatuses connected to the image forming apparatus in the image forming system. Accordingly, the present exemplary embodiment can achieve a high power saving effect.

In the first and the second exemplary embodiments described above, the CPU 1011 turns on the batch power control relays 504, 604, 704, 804, and 904 by batch processing, using the batch power control line 1006. However, alternatively, the batch power control relays 504, 604, 704, 804, and 904 can be turned on by batch processing, using a wireless communication.

In the first and the second exemplary embodiments described above, the image forming system includes the image forming apparatus 1000 and the plurality of postprocessing apparatuses connected to the image forming apparatus 1000. However, alternatively, the image forming system can include the image forming apparatus 1000 and a plurality of option apparatuses connected to the image forming apparatus 1000 and configured to feed sheets into the image forming apparatus 1000.

If the above-described alternative configuration is employed, the power supply to an option apparatus provided upstream, in the sheet feeding direction, of an option apparatus, which is provided upstream of the image forming apparatus 1000 in the sheet conveyance direction, can be controlled to be discontinued.

In addition, the image forming apparatus according to the first and the second exemplary embodiments described above can be applied to various apparatuses, such as a printing apparatus or a multifunction peripheral (MFP). Furthermore, as described above, the image forming apparatus according to the first and the second exemplary embodiments employs the electrophotographic method as the print method thereof. However, the print method of the present invention is not limited to the electrophotographic method. In other words, an inkjet print method and a thermal transfer print method can be used.

The number of the postprocessing apparatuses connected to the image forming apparatus according to the first and the second exemplary embodiments is not limited to a specific number. Furthermore, various types of postprocessing apparatuses can be connected to the image forming apparatus according to the first and the second exemplary embodiments as arbitrarily desired by the user.

More specifically, as the postprocessing apparatus according to the present invention, various type of apparatuses, such as a stapling apparatus configured to bind a bundle of sheets having an image formed thereon by stapling, a folding apparatus configured to fold the sheet, a sorting apparatus configured to sort the sheets, a punching apparatus configured to punch a binding hole on the sheet, an automatic two-sided conveyance apparatus configured to form an image on both sides of the sheet, an insertion apparatus configured to insert another sheet between the sheets, a cutting apparatus configured to simultaneously cut a large number of sheets, an automatic document feeding apparatus configured to automatically feed a document into a scanner, and a post-fixing processing apparatus configured to process an output image with a high image quality, can also be used.

In addition, the sheet to be conveyed into the image forming apparatus according to the first or the second exemplary embodiment is not limited to a specific type of sheet. To paraphrase this, as the sheet to be conveyed into the image forming apparatus according to the first or the second exemplary embodiment, an overhead projector (OHP) sheet, a thick paper sheet, or a tab paper sheet can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-186190 filed Aug. 23, 2010, which is hereby incorporated by reference herein in its entirety.

What is claimed is:

1. An image forming system including an image forming apparatus, which is configured to form an image on a sheet according to an input print job, and a plurality of postprocessing apparatuses, which are serially connected to the image forming apparatus on a downstream side of the image forming apparatus in a sheet conveyance direction and which is configured to execute postprocessing on a sheet discharged from the image forming apparatus, the image forming system comprising:
    a supply unit configured to supply the plurality of postprocessing apparatuses with a signal, which instructs a batch power supply to the plurality of postprocessing apparatuses; and
    a control unit configured, after the plurality of postprocessing apparatuses have been powered on by the supply unit instructing the batch power supply, to discontinue a power supply to a second postprocessing apparatus, which is connected further downstream of a first postprocessing apparatus provided most downstream in a direction of conveying the sheet in the input print job, of the plurality of postprocessing apparatuses.

2. The image forming system according to claim 1,
    wherein the second postprocessing apparatus is connected to the first postprocessing apparatus via an individual power control unit, and
    wherein the control unit is configured to discontinue the power supply to the second postprocessing apparatus by using the individual power control unit.

3. The image forming system according to claim 2, further comprising:
    a first relay provided in the second postprocessing apparatus which is configured to be turned on when the signal is supplied from the supply unit; and
    a second relay provided in the second postprocessing apparatus and which is controlled to be turned on when the first relay is turned on and controlled to be turned off when a second signal for discontinuing the power supply to the second postprocessing apparatus is input from the individual power control unit,
    wherein the control unit is configured to turn off the first relay after the second relay is turned on, and
    wherein the power is supplied to the second postprocessing apparatus when either one of the first and the second relays has been turned on and the power supply to the second postprocessing apparatus is discontinued if both the first and the second relays have been turned off.

4. The image forming system according to claim 1, wherein the control unit is configured to discontinue the power supply to the plurality of postprocessing apparatuses provided on a downstream side of the first postprocessing apparatus, among the plurality of postprocessing apparatuses, by discontinuing the power supply to the second postprocessing apparatus.

5. A postprocessing apparatus configured to execute postprocessing on a sheet on which an image is formed by an image forming apparatus according to an input print job and discharged from the image forming apparatus, the postprocessing apparatus comprising:
- an input unit configured to be input a signal for executing a batch power supply to the postprocessing apparatus and to another postprocessing apparatus, which is connected on a downstream side of the postprocessing apparatus in a sheet conveyance direction; and
- a control unit configured, when the postprocessing apparatus is located most downstream in a direction of conveying the sheet in the input print job, to discontinue the power supply to the another postprocessing apparatus after the power is supplied to the postprocessing apparatus according to the signal input by the input unit.

6. The postprocessing apparatus according to claim 5, wherein the control unit is configured to discontinue the power supply to the another postprocessing apparatus via an individual power control unit, which output a signal for discontinuing the power supply to the another postprocessing apparatus.

7. The postprocessing apparatus according to claim 5, wherein the control unit is configured to discontinue the power supply to the another postprocessing apparatus, when the power supply to the postprocessing apparatus is discontinued via an individual power control unit, which connects the postprocessing apparatus with a third postprocessing apparatus on an upstream side of the postprocessing apparatus in a sheet conveyance direction or with the image forming apparatus.

8. The postprocessing apparatus according to claim 7, further comprising:
- a first relay configured to be turned on according to the signal input by the input unit; and
- a second relay configured to be turned on when the first relay is turned on and configured to be turned off when a second signal for discontinuing the power supply to the postprocessing apparatus is input via the individual power control unit,
- wherein the power supply to the postprocessing apparatus is discontinued when both the first and the second relays are turned off.

9. A postprocessing apparatus configured to execute postprocessing on a sheet on which an image formed by an image forming apparatus according to an input print job and discharged from the image forming apparatus, the postprocessing apparatus comprising:
- an input unit configured to input a signal for executing a batch power supply to the postprocessing apparatus and to another postprocessing apparatus, which is connected on an upstream side of the postprocessing apparatus in a sheet conveyance direction;
- a receiving unit configured, when the another postprocessing apparatus is located most downstream in a direction of conveying the sheet in the print job, to receive an off signal for discontinuing the power supply to the postprocessing apparatus, which is transmitted from the image forming apparatus; and
- a control unit configured to discontinue the power supply to the postprocessing apparatus, when the off signal is received by the receiving unit after the power is supplied to the postprocessing apparatus according to the signal input by the input unit.

10. The postprocessing apparatus according to claim 9, further comprising:
- a first relay configured to be turned on according to the signal input by the input unit; and
- a second relay configured to be turned on when the first relay is turned on and configured to be turned off according to the off signal received by the receiving unit,
- wherein the power supply to the postprocessing apparatus is discontinued when both the first and the second relays are turned off.

11. An image forming apparatus configured to form an image on a sheet according to an input print job, the image forming apparatus comprising:
- a batch control unit configured to supply a plurality of postprocessing apparatuses, which execute postprocessing on a sheet discharged from the image forming apparatus, with a signal for starting a batch power supply to the plurality of postprocessing apparatuses; and
- a transmission unit configured to transmit an off signal, which is a signal for discontinuing a power supply to a second postprocessing apparatus, which is provided further downstream of a first postprocessing apparatus provided most downstream in a direction of conveying the sheet in the input print job, of the plurality of postprocessing apparatuses, to the first postprocessing apparatus via a communication unit for executing a communication between the image forming apparatus and the plurality of postprocessing apparatuses.

12. The image forming apparatus according to claim 11, further comprising an individual control unit configured to discontinue a power supply to a postprocessing apparatus connected adjacently to the image forming apparatus on the downstream side of the image forming apparatus, of the plurality of postprocessing apparatuses, wherein the individual control unit is configured, when the sheet is not to be conveyed into the plurality of postprocessing apparatuses in the input print job, to discontinue the power supply to the postprocessing apparatus connected adjacently to the image forming apparatus on the downstream side of the image forming apparatus.

13. An image forming apparatus configured to form an image on a sheet according to an input print job, the image forming apparatus comprising:
- a batch control unit configured to supply a plurality of postprocessing apparatuses, which execute processing on a sheet discharged from the image forming apparatus, with a signal for starting a batch power supply to the plurality of postprocessing apparatuses; and
- a transmission unit configured to transmit an off signal for individually discontinuing a power supply, to the plurality of postprocessing apparatuses connected further downstream of a first postprocessing apparatus, which is provided most downstream in a direction of conveying the sheet in the print job, of the plurality of postprocessing apparatuses, via a communication unit for executing a communication between the image forming apparatus and the plurality of postprocessing apparatuses.

14. An image forming system including an image forming apparatus, which is configured to form an image on a sheet according to an input print job, and a plurality of option apparatuses, which are serially connected to the image forming apparatus on an upstream side of the image forming apparatus in a sheet conveyance direction and which are configured to feed a sheet to the image forming apparatus, the image forming system comprising:
- a supply unit configured to supply the plurality of option apparatuses with a signal, which instructs a batch power supply to the plurality of option apparatuses; and a control unit configured, after the plurality of option apparatuses have been powered on by the supply unit instructing to batch power supply, to discontinue a power supply to a second option apparatus, which is connected further upstream of a first option apparatus provided most upstream in a direction of feeding the sheet in the input print job, of the plurality of option apparatuses.

15. The image forming system according to claim 14, wherein the second option apparatus is connected to the first option apparatus via an individual power control unit, and
wherein the control unit is configured to discontinue the power supply to the second option apparatus by using the individual power control unit.

16. The image forming system according to claim 15, further comprising:
a first relay provided in the second option apparatuses and which is controlled to be turned on when the signal is supplied from the supply unit; and
a second relay provided in the second option apparatus and which is controlled to be turned on when the first relay is turned on and controlled to be turned off when a second signal for discontinuing the power supply to the second option apparatus is input from the individual power control unit,
wherein the control unit is configured to turn off the first relay after the second relay is turned on, and
wherein the power is supplied to the second option apparatus when either one of the first and the second relays has been turned on and the power supply to the second option apparatus is discontinued when both the first and the second relays have been turned off.

17. The image forming system according to claim 14, wherein the control unit is configured to discontinue the power supply to the plurality of option apparatuses provided on an upstream side of the first option apparatus, among the plurality of option apparatuses, by discontinuing the power supply to the second option apparatus.

18. An option apparatus configured to feed a sheet to an image forming apparatus configured to form an image on the sheet according to an input print job, the option apparatus comprising:
an input unit configured to be input a signal for executing a batch power supply to the option apparatus and to another option apparatus, which is connected on an upstream side of the option apparatus in a direction of feeding the sheet to the image forming apparatus; and
a control unit configured, when the option apparatus is located most upstream in a direction of feeding the sheet to the image forming apparatus in the input print job, to discontinue the power supply to the another option apparatus after the power is supplied to the option apparatus according to the signal input by the input unit.

19. The option apparatus according to claim 18, wherein the control unit is configured to discontinue the power supply to the another option apparatus via an individual power control unit, which output a signal for discontinuing the power supply to the another option apparatus.

20. The option apparatus according to claim 18, wherein the control unit is configured, when the power supply to the option apparatus is discontinued via an individual power control unit, which connects the option apparatus with a third option apparatus connected to the option apparatus on an downstream side of the option apparatus in a direction of feeding the sheet to the image forming apparatus or with the image forming apparatus, to discontinue the power supply to the another option apparatus.

21. The option apparatus according to claim 20, further comprising:
a first relay configured to be turned on according to the signal input by the input unit; and
a second relay configured to be turned on when the first relay is turned on and configured to be turned off when a second signal for discontinuing the power supply to the option apparatus is input via the individual power control unit,
wherein the power supply to the option apparatus is discontinued when both the first and the second relays are turned off.

22. An option apparatus configured to feed a sheet to an image forming apparatus configured to form an image on the sheet according to an input print job, the option apparatus comprising:
an input unit configured to be input a signal for executing a batch power supply to the option apparatus and to another option apparatus, which is connected on an downstream side of the option apparatus in a direction of feeding the sheet to the image forming apparatus;
a receiving unit configured, when above another option apparatus is located most upstream in a direction of feeding the sheet to the image forming apparatus in the print job, to receive an off signal for discontinuing the power supply to the option apparatus, which is transmitted from the image forming apparatus; and
a control unit configured, when the off signal is received by the receiving unit after the power is supplied to the option apparatus according to the signal input by the input unit, to discontinue the power supply to the option apparatus.

23. The option apparatus according to claim 22, further comprising:
a first relay configured to be turned on according to the signal input by the input unit; and
a second relay configured to be turned on when the first relay is turned on and configured to be turned off according to the off signal received by the receiving unit,
wherein the power supply to the option apparatus is discontinued when both the first and the second relays are turned off.

24. An image forming apparatus configured to form an image on a sheet according to an input print job, the image forming apparatus comprising:
a batch control unit configured to supply a plurality of option apparatuses, which are connected to the image forming apparatus in tandem and configured to feed a sheet to the image forming apparatus, with a signal for starting a batch power supply to the plurality of option apparatuses; and
a transmission unit configured to transmit an off signal, which is a signal for discontinuing a power supply to a second option apparatus, which is provided further upstream of a first option apparatus provided most upstream in a direction of feeding the sheet to the image forming apparatus in the input print job, among the plurality of option apparatuses, to the first option apparatus via a communication unit for executing a communication between the image forming apparatus and the plurality of option apparatuses.

25. The image forming apparatus according to claim 24, further comprising an individual control unit configured to discontinue a power supply to a option apparatus connected adjacently to the image forming apparatus on the upstream side of the image forming apparatus, among the plurality of option apparatuses, when the sheet is not to be fed into the image forming apparatus in the input print job.

26. An image forming apparatus configured to form an image on a sheet according to an input print job, the image forming apparatus comprising:
   a batch control unit configured to supply a plurality of option apparatuses, which are connected to the image forming apparatus in tandem and configured to feed the sheet to the image forming apparatus, with a signal for starting a batch power supply to the plurality of option apparatuses; and
   a transmission unit configured to transmit an off signal for individually discontinuing a power supply to the plurality of option apparatuses connected further upstream of a first option apparatus, which is provided most upstream in a direction of feeding the sheet to the image forming apparatus in the print job, among the plurality of option apparatuses, via a communication unit for executing a communication between the image forming apparatus and the plurality of option apparatuses.

27. A controller for an image forming system including an image forming apparatus, which is configured to form an image on a sheet according to an input print job, and a plurality of postprocessing apparatuses, which are serially connected to the image forming apparatus on a downstream side of the image forming apparatus in a sheet conveyance direction and which is configured to execute postprocessing on a sheet discharged from the image forming apparatus, the controller comprising:
   a supply unit configured to supply the plurality of postprocessing apparatuses with a signal, which instructs a batch power supply to the plurality of postprocessing apparatuses; and
   a control unit configured, after the plurality of postprocessing apparatuses have been powered on by the supply unit instructing the batch power supply, to discontinue a power supply to a second postprocessing apparatus, which is connected further downstream of a first postprocessing apparatus provided most downstream in a direction of conveying the sheet in the input print job, of the plurality of postprocessing apparatuses.

28. The controller according to claim 27, wherein the second postprocessing apparatus is connected to the first postprocessing apparatus via an individual power control unit, and
   wherein the control unit is configured to discontinue the power supply to the second postprocessing apparatus by using the individual power control unit.

29. The controller according to claim 28, further comprising:
   a first relay provided in the second postprocessing apparatuses and which is configured to be turned on when the signal is supplied from the supply unit; and
   a second relay provided in the second postprocessing apparatus and which is controlled to be turned on when the first relay is turned on and controlled to be turned off when a second signal for discontinuing the power supply to the second postprocessing apparatus is input from the individual power control unit,
   wherein the control unit is configured to turn off the first relay after the second relay is turned on, and
   wherein the power is supplied to the second postprocessing apparatus when either one of the first and the second relays has been turned on and the power supply to the second postprocessing apparatus is discontinued when both the first and the second relays have been turned off.

30. The controller according to claim 27, wherein the control unit is configured to discontinue the power supply to the plurality of postprocessing apparatuses provided on a downstream side of the first postprocessing apparatus, among the plurality of postprocessing apparatuses, by discontinuing the power supply to the second postprocessing apparatus.

31. A controller for an image forming system including an image forming apparatus, which is configured to form an image on a sheet according to an input print job, and a plurality of option apparatuses, which are serially connected to the image forming apparatus on an upstream side of the image forming apparatus in a sheet conveyance direction and which are configured to feed a sheet to the image forming apparatus, the image forming system comprising:
   a supply unit configured to supply the plurality of option apparatuses with a signal, which instructs a batch power supply to the plurality of option apparatuses; and
   a control unit configured, after the plurality of option apparatuses have been powered on by the supply unit instructing to batch power supply, to discontinue a power supply to a second option apparatus, which is connected further upstream of a first option apparatus provided most upstream in a direction of feeding the sheet in the input print job, of the plurality of option apparatuses.

32. The controller according to claim 31, wherein the second option apparatus is connected to the first option apparatus via an individual power control unit, and
   wherein the control unit is configured to discontinue the power supply to the second option apparatus using the individual power control unit.

33. The controller according to claim 32, further comprising:
   a first relay provided in the second option apparatuses and which is controlled to be turned on when the signal is supplied from the supply unit; and
   a second relay provided in the second option apparatus and which is controlled to be turned on when the first relay is turned on and controlled to be turned off when a second signal for discontinuing the power supply to the second option apparatus is input from the individual power control unit,
   wherein the control unit is configured to turn off the first relay after the second relay is turned on, and
   wherein the power is supplied to the second option apparatus when either one of the first and the second relays has been turned on and the power supply to the second option apparatus is discontinued when both the first and the second relays have been turned off.

34. The controller according to claim 31, wherein the control unit is configured to discontinue the power supply to the plurality of option apparatuses provided on an upstream side of the first option apparatus, among the plurality of option apparatuses, by discontinuing the power supply to the second option apparatus.

* * * * *